United States Patent [19]
Uphaus

[11] Patent Number: 6,026,923
[45] Date of Patent: Feb. 22, 2000

[54] SUSPENSION FOR UNIBODY TOY VEHICLE

[75] Inventor: Roderick Uphaus, Troy, Ala.

[73] Assignee: Carter Brothers Mfg. Co., Inc., Brundidge, Ala.

[21] Appl. No.: 08/964,789

[22] Filed: Nov. 5, 1997

[51] Int. Cl.[7] .................................................. B62D 21/00
[52] U.S. Cl. .......................................... 180/312; 280/781
[58] Field of Search .............................. 180/312; 280/781

[56] References Cited

U.S. PATENT DOCUMENTS

| | | | |
|---|---|---|---|
| 4,896,899 | 1/1990 | Lawrence | 180/350 |
| 5,238,267 | 8/1993 | Hutchinson et al. | 180/312 |

Primary Examiner—Kenneth R. Rice
Attorney, Agent, or Firm—Robert J. Veal; Kenneth M. Bush; Veal & Bush, LLC

[57] ABSTRACT

A go-kart construction uses a unibody construction wherein the body serves as a part of the suspension as well. The molded body is made from a flexible yet resilient material such as fiberglass or a suitable plastic such that it has sufficient flexion about a longitudinal axis to allow some twisting deformity without sagging when a passenger is supported in the vehicle. The forward suspension is mounted only to the forward portion of the molded body and includes a transverse member on which vertical bearings for the steerable guidance wheels are mounted, however, the transverse member is connected to the flexible body only by a pair of longitudinally extending members which are freely rotatably connected to the transverse member at their forward ends.

12 Claims, 4 Drawing Sheets

SUSPENSION FOR UNIBODY TOY VEHICLE

FIELD OF THE INVENTION

The present invention relates to the field of miniature vehicles and more particularly to the field of vehicles designed for use by children. In even greater particularity the present invention relates to vehicles for children designed for low speeds over outdoor terrain. In still greater particularity, the present invention may be described as an internal combustion powered vehicle having a ground following suspension comprised of a flexible body and an independent forward suspension.

BACKGROUND

Children's vehicles or carts as they are sometimes called are well known in the art. Internal combustion karts are often called "go-karts", presumably in recognition of the ability of the vehicles to traverse the ground at an apparent high rate of speed relative to the proximity to the ground. Accordingly, "go-carts" may not be suitable for very young drivers such as preschoolers. One form of vehicle for very young drivers is the battery operated toy car, however, the battery frequently requires recharging and is cumbersome to recharge and to transport. Therefore, the toy is often left sitting in an unused state for long periods of time, or is quickly disposed of by parents who become frustrated by the charging cycle of the battery or the low tolerance of such vehicles for outdoor terrain.

Carts are often provided with a substantially rigid frame such that the wheels on either side are fixed in relation to each other. The carts are not built with leaf spring suspension like passenger cars or with compression springs, therefore, when uneven or unlevel terrain is encountered, often times one of the steerable guidance wheel will be lifted off the ground thereby reducing the control of the vehicle frightening the young driver and perhaps resulting in a total loss of control.

There exists a need for a cart which offers the convenience of an internal combustion engine with the safety of a ground engaging suspension and a low speed of operation.

SUMMARY OF THE INVENTION

It is the principal object of the present invention to provide a safe vehicle for children to use in an outdoor environment.

It is a further object of the present invention to provide a cart type vehicle for children that has the positive steering capabilities enhanced by continuous contact of the guidance wheels with the ground.

It is an associated object of the present invention to provide a cart type vehicle for children which has a flexible suspension system that allows the child to maintain control of the vehicle.

These and further objects and advantages of the present invention are advantageously accomplished by the use of a UNIBODY construction wherein the body serves as a part of the suspension as well. The molded body is made from a flexible yet resilient material such as fiberglass or a suitable plastic such that it has sufficient flexion about a longitudinal axis to allow some twisting deformity without sagging when a passenger is supported in the vehicle. The forward suspension is mounted only to the forward portion of the molded body and includes a transverse member on which vertical bearings for the steerable guidance wheels are mounted, however, the transverse member is connected to the flexible body only by a pair of longitudinally extending members which are freely rotatably connected to the transverse member at their forward ends. Thus, as one side or the other of the body is elevated relative to the other such that the body flexes about its longitudinal axis, the transverse member is free to align itself with the inclination of the subjacent surface, and thereby keep both steerable wheels in contact with the ground.

BRIEF DESCRIPTION OF THE DRAWINGS

Apparatus embodying features of the invention are depicted in the accompanying drawings which form a portion of this disclosure and wherein.

DESCRIPTION OF THE PREFERRED EMBODIMENT

Figure 1:
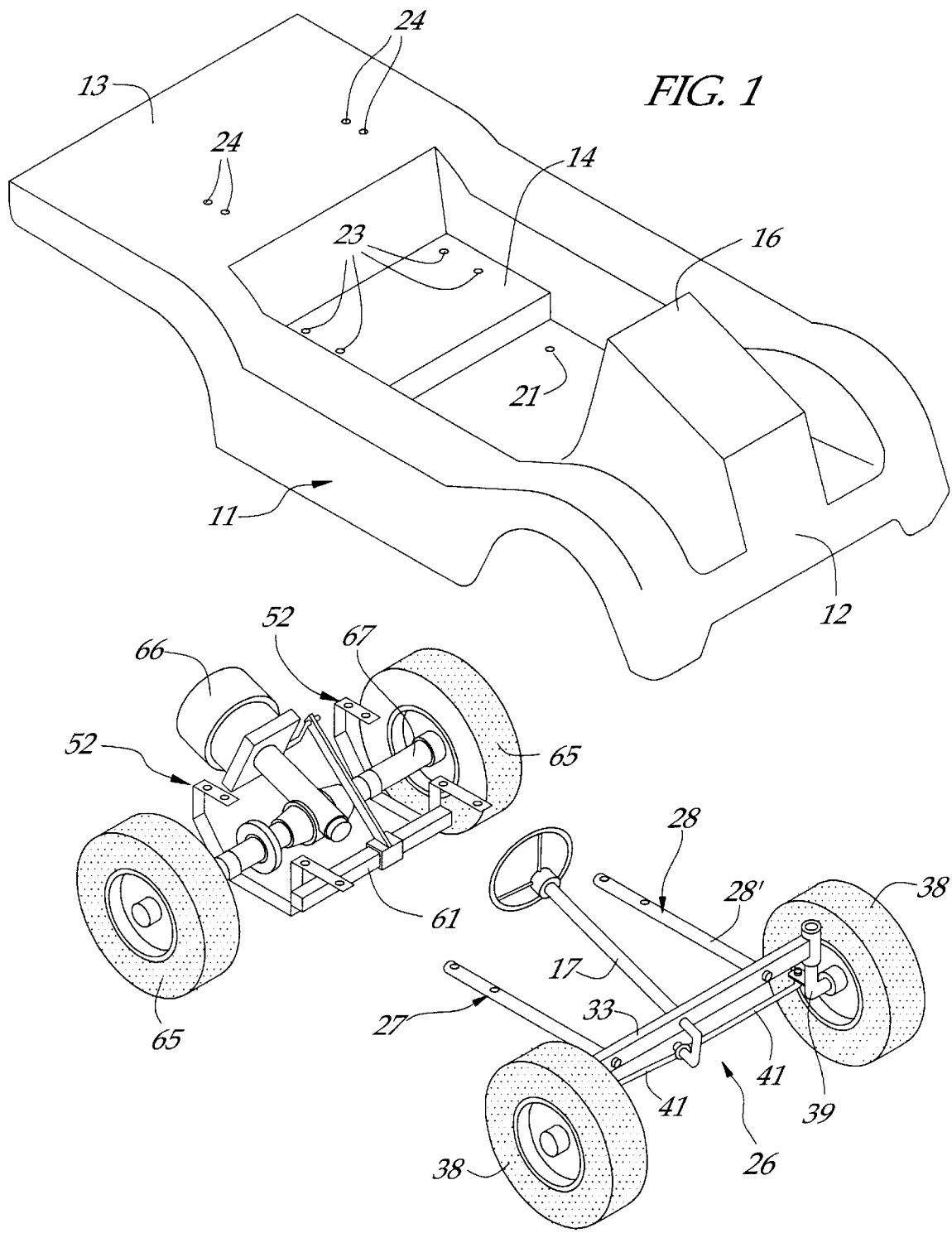
FIG. 1 is an exploded perspective view showing the body and suspension members separated from one another.
Figure 2:
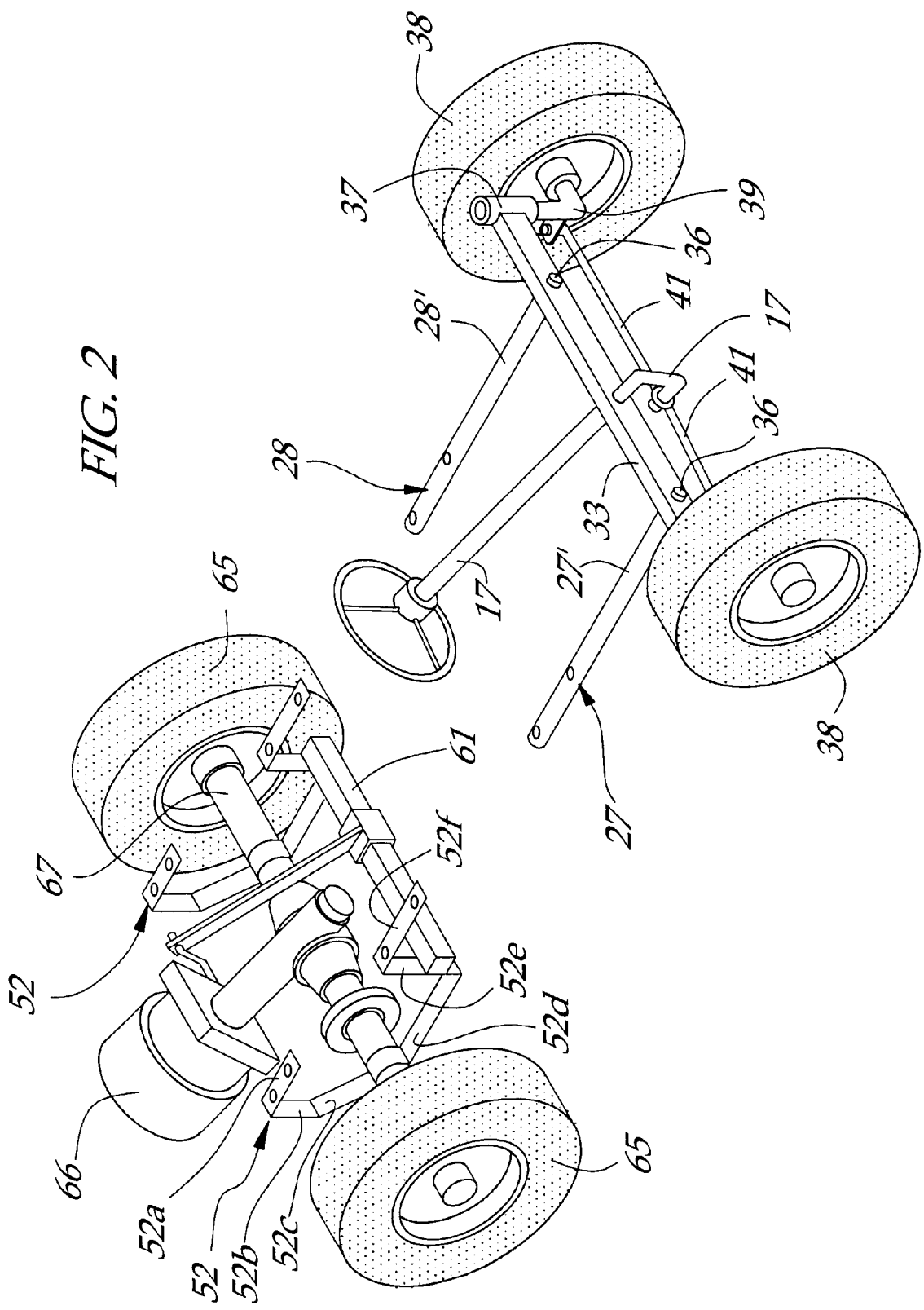
FIG. 2 is a detailed perspective view of the suspension members.
Figure 3:
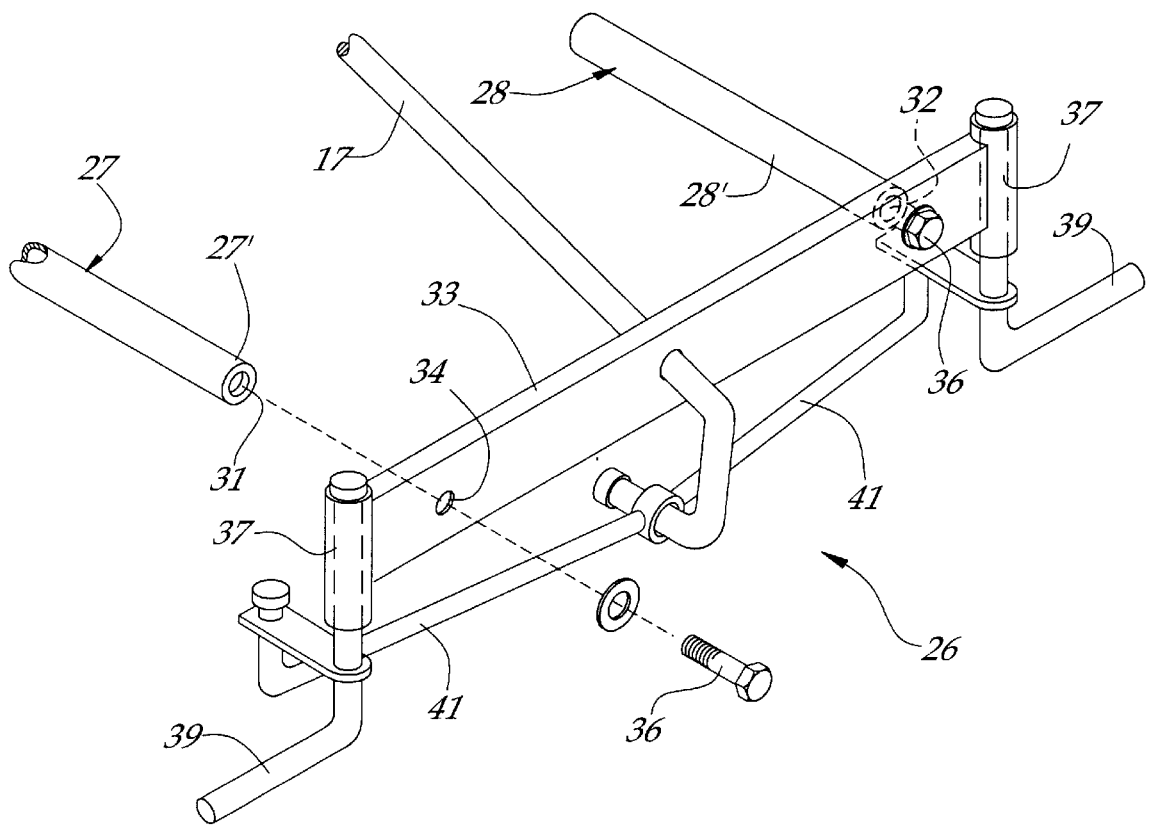
FIG. 3 is a detailed view of the front suspension in perspective.
Figure 4:
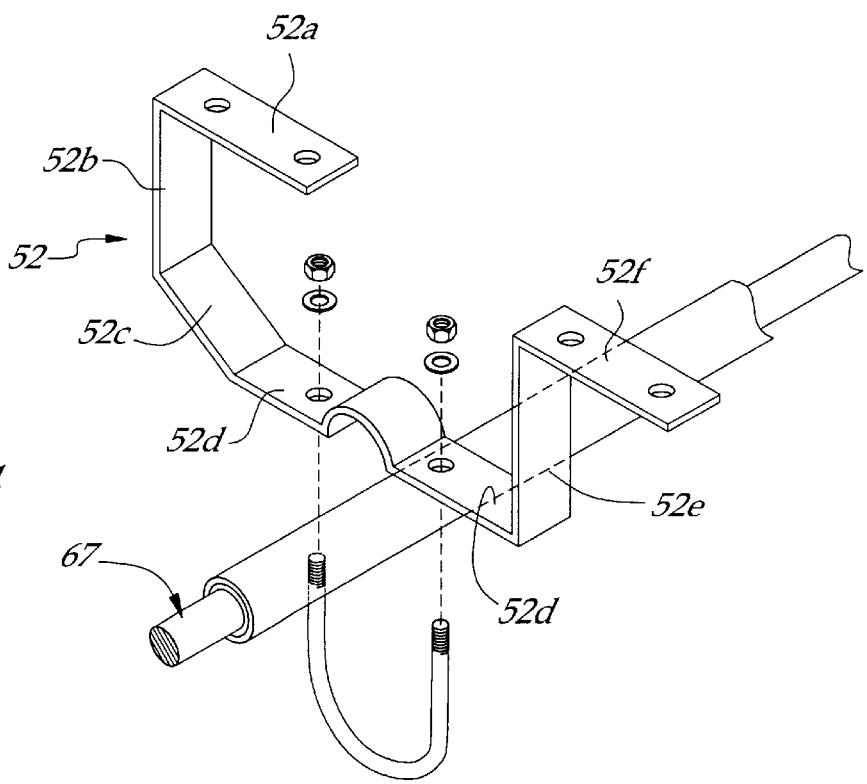
FIG. 4 is a detailed view of the rear suspension in perspective.
Figure 5:
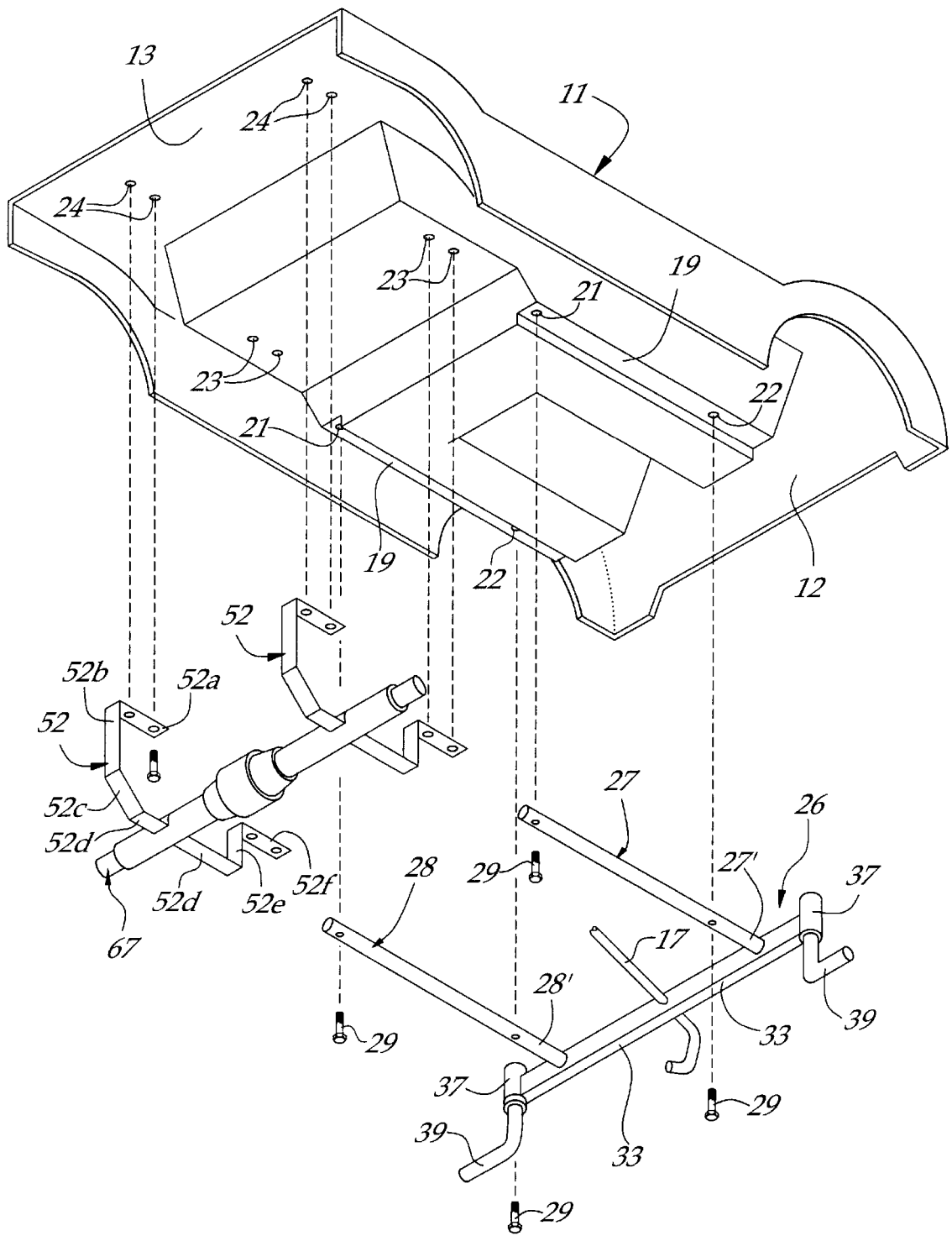

Referring to the Figures for a clearer understanding of the invention, it will be appreciated in FIG. 1 that the present invention is concerned with a combination of elements in a particular manner. Specifically, the cart which embodies this invention utilizes a unibody construction in that the body 11 is generally molded as a monolithic structure. Preferentially, the body 11 is molded from fiberglass or some durable plastic such as ABS, although some ceramic composite materials may be acceptable. The necessary quality of the body material is that it be sufficiently rigid to support a passenger without the need for a full frame suspension and flexible enough about a longitudinal axis to achieve the result described hereinafter.

The body 11 is formed with a forward portion 12 and a rearward portion 13, with a passenger seat 14 formed intermediate the forward and rearward portions. A console like projection 16 may be formed longitudinally forwardly of the passenger seat at 14 and a steering column 17 with an attached steering wheel may extend from the console. The underside 18 of body 11 is formed with a pair of longitudinal grooves 19 extending beneath forward portion 12. Apertures 21 and 22 are formed in the body at intervals along the grooves 19. Apertures 23 are formed in passenger seat 14 and Apertures 24 are formed in the rear portion 13.

A front suspension assembly 26 is affixed to the body 11 by a nut and bolt connection through apertures 21 and 22. A pair of elongated tubes 27 and 28 are cooperatively received in grooves 19 and affixed to the body 11 with bolt and nut combinations 29. As may be seen the tubes are positioned in the grooves 19 such that apertures 21 and 22 are offset toward the rear most end of the tubes. The forward ends 27' and 28' of tubes 27 and 28 have internal threads 31 and 32 formed therein. A transverse frame member 33 has a pair of spaced apart orifices 34 therethrough in axial alignment with tubes 27 and 28 such that a pair of threaded connectors 36 may pass therethrough for threaded engagement with threads 31 and 32. The orifices 34 are unthreaded and receive connectors 36 rotatably therein such that each tube 27, 28 and frame member 33 are rotatable relative to each other about the longitudinal axis of the tube 27 or 28.

Frame member 33 had an aperture in which the steering column 17 is captured for rotation. At either end of frame member 33, a pair of vertical sleeves 37 are affixed to receive therethrough an L-shaped axle 39 for each steerable wheel 38. The L-shaped axles are appropriately mounted in the sleeves in bearings which allow rotation about a generally vertical axis such that the associated wheel 38 mounted on the horizontal portion of the axle is turned to the right or left. The axles 39 are cooperatively attached to the steering column 17 by tie rods 41. From the forgoing it may be seen that the only attachment of the steerable wheels to the body is via the tubes 27 and 28, such that as the vehicle traverses an uneven surface and the body 11 flexes about its longitudinal axis both tubes 27 and 28 rotate within orifices.

The rear suspension 51 connects rear portion 13 of body 11 to a pair of drive wheels 65. The suspension includes a pair of longitudinally extending flexion members 52 each including a first segment 52a extending generally horizontally and affixed to a rearward area of rear portion 13, a second segment 52b extending downwardly from a rearmost portion of first segment 52a, a third segment 52c extending downwardly and forwardly from second segment 52b, a fourth segment 52d extending generally horizontally and forwardly from third segment 52c, a fifth segment 52e extending upwardly from fourth segment 52d, and a sixth segment 52f extending forwardly and generally horizontally beneath rear portion of body 11 intermediate said rearmost portion and said passenger seat, said first segment and said sixth segment being affixed to said rear portion 13. Longitudinally extending flexion members 52 are connected by a transverse member 61 extending between respective fifth segments 52e thereof and drive wheels 65 are connected to receive power from said internal combustion engine 66 through an enclosed axle 67 mounted to said fourth segments 52d of said flexion members.

It may be seen from the foregoing that the front and rear suspensions are independent from each other and the body of the vehicle allows all four wheels to remain in constant engagement with the underlying surface even on uneven terrain such as might be encountered in a yard, wherein a preschooler would be expected to operate the kart. It should be understood that the internal combustion engine would be appropriately governed to avoid operation of the kart at an excessive speed.

What I claim is:

1. A vehicle, suitable for use by a child, having an internal combustion engine providing motive power thereto, comprising, in combination:
   a. a molded unitary body of a flexible resilient material defining a front portion, a rear portion, and a passenger seat;
   b. a forward suspension assembly affixed to said front portion of said molded unitary body and to a pair of concomitantly steerable front wheels, said suspension and said body adapted to allow each of said pair of front wheels to follow the contour of a surface supporting said vehicle independently of said other one of said pair of front wheels.

2. A vehicle, suitable for use by a child, having an internal combustion engine providing motive power thereto, comprising, in combination:
   a. a molded unitary body of a flexible resilient material defining a front portion, a rear portion, and a passenger seat; and
   b. a forward suspension assembly affixed to said front portion of said molded unitary body and to a pair of concomitantly steerable front wheels, said suspension and said body adapted to allow each of said pair of front wheels to follow the contour of a surface supporting said vehicle independently of said other one of said pair of front wheels, said suspension assembly including a first and second longitudinal members extending subjacent said front portion and affixed thereto in spaced relation from one another, a transverse member extending between said first and second longitudinal members and rotatably receiving a forward end of each of said members therethrough, and means for mounting said steerable front wheels to opposing ends of said transverse member for concomitant steering about an axis substantially orthogonal to said transverse member and said longitudinal members.

3. A vehicle as defined in claim 2 wherein said body defines longitudinal channels therein for receiving said longitudinal members forwardly of said passenger seat and further comprising a rear suspension spaced from said forward suspension and connected to said body to support a rear portion thereof.

4. A vehicle as defined in claim 2 wherein said means for mounting comprises a first vertical sleeve affixed to said transverse member at an end thereof and a complementary sleeve affixed to said transverse member at an opposite end thereof said sleeves held in fixed relation to each other by said transverse member, each sleeve receiving there through, a L shaped axle having an upper end extending through said sleeve and captured for rotation therewithin and having a lower end extending outwardly to provide a horizontal axle for one of said wheels.

5. A vehicle as defined in claim 2 wherein said molded unitary body is made of fiberglass and provides the only connection in said vehicle between said front suspension and a rear suspension connected to said body at said rear portion.

6. A vehicle as defined in claim 2 further comprising a rear suspension for supporting said rear portion on a pair of drive wheels comprising in combination: a pair of longitudinally extending flexion members each including a first segment extending generally horizontally and affixed to rearward area of said rear portion, a second segment extending downwardly from a rearmost portion of said first segment, a third segment extending downwardly and forwardly from said second segment, a fourth segment extending generally horizontally and forwardly from said third segment, a fifth segment extending upwardly from said fourth segment, and a sixth segment extending forwardly and generally horizontally beneath said rear portion intermediate said rearmost portion and said passenger seat, said first segment and said sixth segment being affixed to said rear portion.

7. A vehicle as defined in claim 6 wherein said pair of longitudinally extending flexion members are connected by a transverse member extending between respective fifth segments thereof and said drive wheels are connected to receive power from said internal combustion engine through an enclosed axle mounted to said fourth segments of said flexion members.

8. In a vehicle for children, wherein said vehicle has an internal combustion engine and a means for controlling the direction of said vehicle through a pair of forwardly mounted wheels, the improvement comprising: a flexible unitary body having a forward and rear portion and serving as part of the suspension of said vehicle to support a passenger on a seat formed thereon; forward suspension means cooperatively connected to said unitary body at said forward portion such that said body and suspension means allow each of said pair of forwardly mounted wheels to follow the contour of a surface supporting said vehicle without the use of springs said forward suspension including a pair of longitudinal members affixed to the forward portion of said body and a transverse member supported on said forwardly mounted wheels and extending between said pair of longitudinal members at a forward end thereof with each of said pair of longitudinal members independently rotatably connected to said transverse member; and a separate rear suspension affixed to and supporting said rear portion of said body on a pair of drive wheels.

9. In a vehicle as defined in claim 8 wherein said body is the only connection between said front suspension and said rear suspension and is made from a material selected from the group consisting of fiberglass, fiber reinforced resins, abs plastic, and polyester, such that said body exhibits sufficient rigidity to support a rider and sufficient elasticity to allow said guidance wheels move vertically relative to each other in accordance with a subjacent surface.

10. In a vehicle as defined in claim 8 wherein said rear suspension for supporting said rear portion on a pair of drive wheels comprises in combination: a pair of longitudinally extending flexion members fixed to said rear portion of said body in spaced relation to each other and connected by a cross member, said flexion members cooperatively affixed to a housing for an axle connected to said drive wheels.

11. In a vehicle as defined in claim 8 wherein said body defines longitudinal channels therein for receiving said longitudinal members forwardly of said passenger seat said longitudinal members being cantilevered relative to said passenger seat.

12. In a vehicle as defined in claim 11 wherein said front suspension further comprises a first vertical sleeve affixed to said transverse member at an end thereof and a complementary sleeve affixed to said transverse member at an opposite end thereof said sleeves held in fixed relation to each other by said transverse member, each sleeve receiving there through a L shaped axle having an upper end extending through said sleeve and captured for rotation therewithin and having a lower end extending outwardly to provide a horizontal axle for one of said wheels.

\* \* \* \* \*